United States Patent
Groppi et al.

(10) Patent No.: US 9,890,333 B2
(45) Date of Patent: Feb. 13, 2018

(54) PACKED-BED TUBULAR REACTOR FOR HETEROGENEOUS EXOTHERMIC OR ENDOTHERMIC CATALYTIC REACTIONS

(71) Applicant: ENI S.p.A., Rome (IT)

(72) Inventors: Gianpiero Groppi, Segrate (IT); Enrico Tronconi, Arcore (IT); Carlo Giorgio Visconti, Basiglio (IT); Andrea Tasso, Zelo Buon Persico (IT); Roberto Zennaro, Milan (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 14/914,490

(22) PCT Filed: Sep. 2, 2014

(86) PCT No.: PCT/IB2014/064198
§ 371 (c)(1),
(2) Date: Feb. 25, 2016

(87) PCT Pub. No.: WO2015/033266
PCT Pub. Date: Mar. 12, 2015

(65) Prior Publication Data
US 2016/0208175 A1    Jul. 21, 2016

(30) Foreign Application Priority Data

Sep. 3, 2013 (IT) .............................. MI2013A1439

(51) Int. Cl.
*C10G 2/00* (2006.01)
*B01J 8/06* (2006.01)
*B01J 19/24* (2006.01)

(52) U.S. Cl.
CPC ............. *C10G 2/341* (2013.01); *B01J 8/067* (2013.01); *B01J 19/2485* (2013.01);
(Continued)

(58) Field of Classification Search
CPC . B01J 8/067; B01J 8/0292; B01J 8/008; B01J 2208/00212; B01J 2208/00805; B01J 2208/00884; B01J 2208/065; C10G 2/341
See application file for complete search history.

(56) References Cited

U.S. PATENT DOCUMENTS 2,198,555 A * 4/1940 Wilson et al. ............ B01J 8/06
                                                                208/78
4,027,476 A * 6/1977 Schmidt ................... B01J 35/02
                                                                181/258

(Continued)

FOREIGN PATENT DOCUMENTS

EP    2 022 558 A2    2/2009

OTHER PUBLICATIONS

International Search Report dated Jan. 21, 2015 in PCT/IB2014/064198.

*Primary Examiner* — Lessanework Seifu
(74) *Attorney, Agent, or Firm* — Oblon, McClelland, Maier & Neustadt, L.L.P.

(57) ABSTRACT

A reactor for Fischer-Tropsch reaction effected in a three-phase system essentially consisting of a gaseous reagent phase, a liquid reacted phase and a solid catalytic phase, wherein the solid catalytic phase is composed of packed bodies encaged in at least one open-cell foam structure with a high thermal conductivity.

13 Claims, 3 Drawing Sheets

(52) U.S. Cl.
CPC ..... *C10G 2/332* (2013.01); *B01J 2208/00212* (2013.01); *B01J 2208/00805* (2013.01); *B01J 2208/00884* (2013.01)

(56) References Cited

U.S. PATENT DOCUMENTS

2007/0299148 A1  12/2007  Verbist
2009/0042071 A1   2/2009  Fischer et al.
2011/0166304 A1   7/2011  Zanthoff et al.

\* cited by examiner

PACKED-BED TUBULAR REACTOR FOR HETEROGENEOUS EXOTHERMIC OR ENDOTHERMIC CATALYTIC REACTIONS

The present invention relates to a packed-bed tubular reactor for heterogeneous exothermic or endothermic catalytic reactions.

More specifically, the present invention relates to a reactor for heterogeneous exothermic or endothermic catalytic reactions also having multiphase reagents and products.

Even more specifically, the present invention relates to a reactor for catalytic reactions which involve, as reagents, carbon monoxide and hydrogen, or products deriving therefrom, such as, for example, the steam reforming process of hydrocarbons, the dry-reforming process of hydrocarbons, the combined steam/dry reforming process of hydrocarbons, the synthesis process of methanol, the synthesis process of higher alcohols, the synthesis process of dimethyl ether, the methanation reaction, the water-gas-shift reaction, the reverse water-gas-shift reaction, the Fischer-Tropsch reaction, the methanol-to-gasoline process and the methanol-to-olefins process.

Even more specifically, the present invention relates to a packed-bed reactor for Fischer-Tropsch reactions.

In the present text, all the information and operative and non-operative conditions specified should be considered as being preferred, even if not explicitly indicated.

The Fischer-Tropsch synthesis, discovered in 1923, is a known chemical reaction which transforms the mixture of carbon monoxide and hydrogen, generally called "synthesis gas", into water and a mixture of hydrocarbons with a prevalently linear chain, triphasic (gas-liquid-solid) at room temperature and atmospheric pressure, and substantially biphasic (gas-liquid) under typical process conditions. In addition to water and hydrocarbon compounds, small quantities of oxygenated aliphatic compounds, such as, for example, alcohols, acids, aldehydes and ketones and carbon dioxide, are often formed. Long-chain hydrocarbons are the desired reaction products, which can then be converted, through "upgrading" processes, into chemical species or mixtures of the same with a high added value.

The reaction, which is normally carried out in the presence of a $H_2/CO$ molar ratio ranging from 1 to 3, usually around 2, is highly exothermic, releasing a reaction heat ranging from 35 to 45 kilocalories for each mole of carbon monoxide converted, and it is effected in the presence of a solid catalyst. The latter normally comprises at least one transition metal of groups 8, 9 or 10 of the periodic table of elements, often supported on a metal oxide, a metal carbide, a carbonaceous structure or a mixture of these products, and is possibly promoted with heteroatoms.

The high exothermic nature of the Fischer-Tropsch reaction is a crucial aspect for the design of the reactor in which the process is to be carried out. The insufficient removal of reaction heat, in fact, leads to a poor control of the process temperature, with the consequent formation of local "hot spots" which are normally responsible for the loss of selectivity of the process and, possibly, deterioration of the catalyst. Both consequences lead to a reduction in the yield of products having more than 5 carbon atoms (C5+), defined as moles of C5+ species produced in the time unit and weight unit of the catalyst present in the reactor under certain operative conditions (temperature, pressure, composition and flow-rate of the feed).

For the same reason, i.e. the loss of selectivity to C5+ products with an increase in the temperature, technological development has resorted to identifying increasingly active catalytic systems, capable of operating at progressively lower temperatures (normally lower than 230° C.), in any case guaranteeing satisfactory yields to C5+. For this reason, there is in the current tendency to distinguish between a low-temperature Fischer-Tropsch synthesis, carried out at average temperatures lower than 250° C., and high-temperature Fischer-Tropsch synthesis, carried out at average temperatures higher than 250° C.

International patent application WO 2008/074496, for example, proposes effecting Fischer-Tropsch reactions in reactors defined as "Slurry Bubble Columns" in which the Fischer-Tropsch reaction develops in three-phase systems in which the synthesis gas gurgles, in the form of bubbles, into a catalyst suspension in the reaction liquid. The reaction system, continuously shaken by the rising gas flow, allows the reaction heat to be easily removed by means of a thermal exchange tube system, immersed in the liquid, in which a refrigerating fluid circulates, for example water.

Even if reactors of the type "Slurry Bubble Column" allow extremely favourable reaction yields to be obtained, together with an effective temperature control, they have a series of operative drawbacks, however, such as, for example, the necessity of having to separate the reaction product from the catalyst in suspension, recovering and recycling the latter, in addition to the difficulty of managing the fluid-dynamic conditions in the reactor so as to have a homogeneous dispersion of the catalyst. Furthermore, last-generation industrial reactors for the Fischer-Tropsch synthesis, with the catalyst in suspension, are characterized by large dimensions, with cylindrical equipment having a height in the order of 60 meters and a diameter in the order of 10 meters. The construction and management of these reactors and in particular their maintenance, may not be practicable.

An alternative to the reactors of the "slurry bubble column" type is represented by fixed-bed multitubular reactors. These reactors, whose dimensions are normally smaller with respect to those of reactors of the "slurry bubble column" type, do not exceed 20 meters in height and 7 meters in diameter, they essentially consist of a device comprising a casing or mantle and a pair of upper and lower closing elements, in which are generally provided means for feeding the reagents and means for discharging the reaction products. A plurality of tubes is inserted inside the mantle, each filled with catalyst, for example in the form of pellets. The reagent gas, for example synthesis gas, flows inside the tubes, comes into contact with the catalytic particles, penetrates the pores of the same and, once adsorbed on the catalytically active sites, reacts. The reaction heat generated on the surface of the catalyst is mainly transmitted in a radial direction by means of a prevalently convective mechanism. Once the heat has reached the wall of the reaction tubes and has passed through the same by means of an essentially conductive transfer mechanism, it is removed by a continuous flow of cooling fluid, for example water, which occupies the free volume inside the mantle.

The heat transfer inside the packed bed, present in the reaction tubes, generally represents the greatest resistance to the radial heat exchange. In order to improve the latter, various solutions have been proposed or described, for example in U.S. Pat. No. 4,686,238 (Shell Oil Company) and GB 2.169.919 (Shell International Research Maatschappij BV), in the book "The Fischer-Tropsch and Related Synthesis" (1984) and in the scientific article published in Applied Catalysis A: General 186 (1999) 55-70, such as, for example, recycling part of the reaction products, gaseous and liquid under the process conditions, to the head of the reactor. In this way a higher amount of heat can be removed. The greatest contribution is linked to the increase in the exchange coefficients which positively depend, inter alia, on the specific massive flow-rate of the reagent mixture and its specific heat. A lesser contribution, on the other hand, is given by the heating and/or partial evaporation of the recycled mixture. Recycling the reaction products, however, whether they be gaseous or condensed, not only represents an additional complication in the design of the reactor, in addition to being an operation that is not easy to manage from an operative point of view, but also leads to a decrease in the yield to C5+, under the same conditions of temperature, pressure, flow-rate and fresh composition, causing a lowering of the partial pressure of carbon monoxide and hydrogen inside the reactor and an increase in the space velocity of the mixture flowing in the reactor. Fixed-bed reactors are consequently characterized by a relatively modest specific productivity (per unit time and unit volume of catalyst used).

A first alternative solution to traditional fixed-bed or suspension reactors, for example for the Fischer-Tropsch synthesis, is represented by multitubular reactors with monolithic honeycomb catalysts. An example of this solution can be found in published patent application US 2005/0142049. According to what is described in this patent application, exothermic reactions, or endothermic reactions, can be carried out in multitubular reactors loaded with thermally conductive monolithic honeycomb catalysts. The term monolithic honeycomb structures refers to continuous structures containing a plurality of parallel pass-through channels, such as those produced, for example, according to the method described in patent U.S. Pat. No. 6,881,703 and in published international patent application WO 2005/011889 (Corning Incorporated).

Multitubular reactors with thermo-conductive monolithic catalysts essentially comprise a container in which there is a plurality of tubes forming a tube bundle. Each tube is filled with one or more monolithic honeycomb structures, on the pass-through channels of each of which the catalyst adheres as a thin layer, generally defined as "washcoat". The monolithic structure guarantees a good heat exchange with the thermo-regulation fluid circulating in the container outside the tubes, in that, as the material of the monolith is characterized by a good thermal conductivity, even if it prevents radial heat exchange through convection, due to the segregation of the reagent flow in independent parallel channels, it favours the radial transfer of heat through conduction.

The limit of multitubular reactors with "washcoated" monolithic catalysts lies in the fact that the availability of catalytic active phase per unit of volume of the reactor is smaller than that of traditional reactors. For this reason, the reaction volumes must be increased in order to have an appreciable productivity.

A monolithic reactor having more reduced dimensions thanks to a higher volumetric density of the catalyst and a more efficient removal system of the reaction heat has recently been proposed in published international patent application WO 2010/130399 (in the name of the Applicant). This reactor is based on tubular monoliths comprising, in a continuous metallic matrix with a high conductivity, a series of suitably sized longitudinal channels, filled with the catalyst in granule form. Although satisfactory results have been obtained with said reactor, especially in carrying out Fischer-Tropsch reactions with a reduced encumbrance of the plant installations, difficulties have been encountered in the production phase of the tubular monoliths, in terms of limited dimensions of the diameter of the tubular monolith obtainable with usual industrial methods, and flexibility in projecting the geometry and density (number of channels per unitary section) of the longitudinal channels present therein.

A second alternative solution to fixed-bed or suspension reactors, traditionally used for the Fischer-Tropsch synthesis, is represented by reactors loaded with monolithic catalysts having an open-cell foam structure, also known as sponge structure. Examples of these solutions can be found in published patent applications WO 2007/000506 (Total S.A.), FR 2.934.174 (Total S.A.), WO 2011/102567 (Korea Institute of Energy Research) and WO 2012/038621 (Centre National de la Recherche Scientifique (C.N.R.S.) and Université de Strasbourg).

According to what is described in patent application WO 2007/00506, the Fischer-Tropsch synthesis can be carried out in multi-tubular reactors at least partially loaded with open-cell foams of silicon carbide, impregnated, at least in the part closest to the surface, with the catalytically active phase. The tubes are contained in a jacket in which a cooling means flows, for removing the reaction heat. In some of the configurations described, the reaction tubes are completely full of liquid reaction products, and the flow of reagents is fed from below and rises in the reaction tubes gurgling into this liquid phase. In other configurations, on the other hand, the reaction tubes are prevalently dry and the flow of reagents, fed from the top of the reactor, proceeds towards the bottom of the reactor. In all the reactor solutions described, the use of a foam, consisting of a material having a good thermal conductivity such as silicon carbide, favours the removal of the reaction heat. The part of the tubes possibly not filled with catalytic foam is filled with supported catalysts having granule or extruded geometries.

According to what is described in patent application FR 2.934.174, the Fischer-Tropsch synthesis can be carried out in "plaque" reactors in which open-cell foams of silicon carbide are inserted, impregnated, at least in the part closest to the surface, with the catalytically active phase. The term plaque refers to a tubular structure with a rectangular section, whose short side (length controlling the heat exchange) is at least 15 mm and the long side can have any dimension as required. These "plaques", like the tube of conventional multi-tubular reactors, are arranged in a jacket having a cylindrical or rectangular section, in which a cooling means flows, which, on coming into contact with the plaques, removes the reaction heat.

Also according to what is described in patent application WO 2012/038621, the Fischer-Tropsch synthesis can be carried out in "plaque" reactors filled with open-cell foams of silicon carbide, impregnated, at least in the part closest to the surface, with the catalytically active phase. In order to optimize the yield and selectivity of the Fischer-Tropsch process, however, it is specified in the above patent that the plaques must have a short side of less than 10 mm.

Finally, according to what is described in patent application WO 2011/102567, the Fischer-Tropsch synthesis can be carried out in a reactor-exchanger charged with washcoated open-cell metallic foams with thin layers of a catalytically active phase containing cobalt. The reaction heat is removed with the use of a cooling fluid circulating in the reactor. The configuration proposed allows the thermicity of the reaction to be managed, guaranteeing a good temperature control in the reactor.

Regardless of the specific proposed geometry of the reactor, in all of the patents mentioned above, open-cell foams are adopted as a structured carrier for the catalytic material, which, depending on the circumstances, is impregnated or deposited in/onto the filaments (trabeculae) which form the rigid open-cell or open-pore foam. The first method is preferably adopted when the carrier consists of a porous material, such as silicon carbide, whereas the second method is preferably adopted in the case of foams consisting of non-porous materials, such as metals.

Analogously to what has been previously specified with respect to washcoated monoliths, the limit of reactors loaded with catalysts based on "coated" foams, i.e. impregnated or washcoated with the catalytically active phase, lies in the fact that the availability of catalytic active phase per volume unit of the reactor is less than that of traditional reactors. Open-cell foams suitable for being used as structured carriers for catalytic materials, in fact, have a filling degree, defined as the ratio between the volume of the solid part (full volume) of the foam and the total volume of the same (full volume+cell volume), which rarely exceeds 20%. This limit, which is linked to production methods adopted industrially for synthesizing open-cell foams, can be overcome in the case of metallic foams by compressing the foam once it has been produced. The resulting materials, having filling degrees of up to 70%, however, cannot be easily coated with layers of catalyst using the conventional washcoating techniques.

Although the use of thicker catalytic layers allows to increase the catalyst load in reactors based on washcoated open-cell foams, it also has "technological" limits prevalently linked to the progressive decrease in the adhesion of the washcoating with an increase in the thickness, which is incompatible with the necessity of developing catalytic systems which are stable in time.

Due to the limited availability of catalytic active phase per unit volume of the reactor, in order to reach significant productivities reactors loaded with "coated" foams must have large reaction volumes, which is in contrast with the requirement of developing intensified processes with respect to traditional processes.

A further limit of reactor solutions based on impregnated or washcoated foams is the impossibility of substituting the catalytically active phase which, as it is chemically bound to the foam itself, cannot be easily removed from the same. This specific characteristic produces an increase in the operating costs, as each time the catalyst must be substituted, the foam must also be replaced.

The Applicant has now surprisingly found, as also described in the enclosed claims, that a possible solution to all the problems previously discussed, consists of a mono- or multi-tubular reactor, cooled or heated externally, in which each tube or tubular element is loaded with at least one open-cell foam consisting of a material having a high thermal conductivity, which is filled or packed with a catalyst in particulate form.

An object of the present invention therefore relates to a reactor for heterogeneous exothermic or endothermic catalytic reactions, for example a reactor for the Fischer-Tropsch reaction, in which the catalyst is in the form of particulate, consisting for example of conventional carriers in the form of porous packed bodies such as balls, cylinders, rings, etc., uniformly or non-uniformly impregnated with the catalytically active phase, which is loaded into an open-cell or open-pore foam, preferably rigid, having a suitable porosity, an appropriate cell-size and pore-size, and made of a material having a high thermal conductivity, preferably metallic. Said open-cell or open-pore foam is inserted in tubular reaction elements immersed in an appropriate thermoregulating process fluid, capable of ensuring the heat transfer and allowing an optimum control of the thermicity of the process.

More specifically, an object of the present invention relates to a reactor for exothermic or endothermic catalytic chemical reactions which comprises (or consists of):

a. a substantially cylindrical container which comprises feeding and discharging means of a thermoregulation fluid for the chemical reaction involved;
b. a top closing element and a bottom closing element positioned at the top and bottom ends of the container, respectively;
c. feeding means of the reagent phase positioned in the top closing element and/or in the bottom closing element;
d. discharging means of the reacted phase positioned in the top closing element and/or in the bottom closing element;
e. one or more tubular elements, arranged vertically inside the container (a) between the top closing element and the bottom closing element, each tubular element containing in its interior at least one body having the structure of an open-cell foam or a cellular structure consisting of a network of interwoven filaments which delimit a plurality of unitary hollow volumes, said body being suitable for being filled with a catalyst, also supported, in the form of particulate.

Further objects of the present invention will appear evident from the present description and claims.

Said body with a foam structure occupies at least $1/10$, preferably from $6/10$ to $10/10$, of the internal volume of said one or more tubular elements.

An open-cell foam that can be used in accordance with the present invention is a porous structure consisting of a three-dimensional network of interconnected filaments (trabeculae). The filaments delimit three-dimensional cavities called cells: in the most energetically favourable case, each cell has a maximum volume with the minimum surface area and minimum surface energy. From a geometrical point of view, each cell is similar to a polyhedron which most commonly has 14 faces, corresponding to a tetrakaidecahedron. The faces of this polyhedron, generally delimited by a number of connected trabeculae (and positioned on a single plane) ranging from 3 to 6, are open (this is why the term open-cell foams is used), and are called pores. Depending on the method adopted for producing open-cell foam, the trabeculae can be solid or hollow. The term "cell" or "cavity" as used herein with reference to open-cell foam, therefore indicates the unitary volume, with a polyhedral geometry, enclosed by the material forming the foam itself. The plurality of cells assembled together forms the body of the foam, whereas the openings or faces, which connect adjacent cells to each other, represent the "pores" of the foam. Considering the materials (metallic or ceramic) having a high thermal conductivity which form foams that are suitable for the present invention, these normally have a rigid consistency, or, they do not return to the original dimensions if subjected to compression.

The foam inserted in the tube is filled or packed with a catalytic material in the form of particulate which is distributed in the foam, filling its cells or cavities. The catalytically active material can be supported or not supported and can be available in conventional forms such as, for example, balls, beads, cylinders, rings, etc.

The use of a packed catalytic bed allows the quantity of active phase that can be charged into the reactor to be maximized and enables the use of open-cell foams having a high thermal conductivity, inserted in the tubular reaction elements immersed in an appropriate thermoregulating process fluid, it is capable of favouring the reaction heat transfer to/from the same, allowing an optimum temperature control of the catalytic bed.

Once the average "pore" size of the foam has been suitably selected, i.e. of the faces through which the foam cells communicate with each other, and also the average size of the catalytic particles, the Applicant has surprisingly found that the insertion of the catalyst in particulate form, into the foam, can be effected by simply pouring the particles into the foam itself. The filling phase of the foam can possibly become more efficient through techniques suitable for favouring the transport of the granules of the catalytic particulate into the macroporous structure of the foam, or using techniques suitable for improving the packing of the catalytic material inside the cells of the same, for example by imposing a vibratory motion to the tube containing the foam during the filling phase.

The average pore size of the foam, measured according to the method indicated hereunder, preferably ranges from 0.25 to 10 mm, more preferably from 0.4 to 2.0 mm, even more preferably from 0.5 to 1.0 mm. The average pore size is often conventionally related to the density of the pores per unit of length, which, according to the present invention, is assumed as corresponding to the inverse of their average size, for example, in the preferred case of the present invention, a pore density ranging from 1 to 40, more preferably from 5 to 25, even more preferably from 10 to 20, pores per cm.

The method used for measuring/calculating the main geometrical characteristics of the foam, i.e. the average pore size, pore density and filling degree of the foam, is described hereunder.

The filling degree (also known as relative density) is defined as the ratio between the density of a foam, i.e. its mass per volume unit occupied by cells and trabeculae, and the density of a full solid made of the same material as the trabeculae. The form of the section of the trabeculae generally depends on the value of this parameter: with low filling degrees, this section is similar to a triangle, with high filling degrees it tends to become circular. In the case of foams with full trabeculae, preferred according to the present invention, the filling degree can be easily measured using conventional scales, when the density of the material of which the foam is made, is known. The filling degree (GDP) can in fact be defined as $GDP=\rho_{foam}/\rho_{material}$, wherein $\rho_{foam}$ is the density of the foam, defined as a ratio between the mass and volume of the foam and $\rho_{material}$ is the density of the material of which the foam consists.

In the case of foams with hollow trabeculae, on the other hand, the calculation of the GDP must be effected using a foam density calculated as a ratio between the mass and "full" volume of the foam. The term "full volume" indicates the volume of the foam not accessible to the process fluid, i.e. the sum of the volume occupied by the solid phase of the foam and the volume of the cavities contained in the trabeculae. The "full" volume can be calculated as the difference between the total volume of the foam and the volume of foam accessible to the process fluid. The latter, in turn, can be easily determined by the use of pycnometric methods based on the use of floating scales. For further details, reference should be made to the scientific article published in Chemical Engineering Journal 198-199 (2012) 512-528.

The second geometrical parameter characteristic of an open-cell foam is the average pore size. It has been said that pores are polygonal structures that can have different forms and dimensions. In order to measure their average size ($d_{pore}$), the pores are considered as being circles having the same surface area and the average pore size is indicated as the average diameter of these circles. The average is calculated by evaluating a representative number of pores for each sample, equal to at least 100. The measurement method of the diameter of each pore requires the collection of microscopic images of the sample (by means of optical microscopy or scanning electron microscopy), identifying the circle having an area equivalent to that of the pore, and assessing the diameter of this circle with a known magnification of the image being examined.

The pore density (PD) is a linear measurement, conventionally defined as the number of pores present in a unit of length. The number of pores per centimeter, for example, can be calculated as $PD=10/d_{pore}$, wherein $d_{pore}$, expressed in millimetres, is the average pore size calculated as previously described.

The average size of the catalytic particles of the catalyst in particulate form, packed inside the foam, can be assessed, on the other hand, using a laser granulometer according to the standard ISO 13320-2009.

The ratio between the average pore size of the foam and the average size of the catalytic particles preferably ranges from 1.1 to 30, more preferably from 1.5 to 20, and even more preferably from 2 to 10.

Thanks to a higher volumetric active phase density of the catalyst and an efficient removal system of the reaction heat, the solution proposed in the present invention allows reactors to be developed with a higher productivity per unit volume with respect to traditional reactors of the known art. In other words, reactors which, with respect to the reactor units of the known art, have a higher productivity with the same reactor volume, i.e. having reduced dimensions with the same productivity. This characteristic allows the reactors, object of the present invention, to also be positioned onboard ships, or other floating means (such as, for example, FPSO units) and/or land moving means, in order to be transported to remote positions where there are sources of raw materials for synthesis gas, for example offshore and/or onshore natural gas or associated gas reservoirs, which do not make the use of large-sized reactors convenient or possible, for example slurry bubble column reactors or fixed-bed reactors, i.e. reactors charged with catalysts having an open-cell foam geometry, used as carrier for the catalytic material.

The reactor, object of the present invention, is particularly and preferably suitable for Fischer-Tropsch reactions catalyzed by packed bodies inserted inside the foam cells.

According to the present invention, the container is substantially cylindrical and can have any dimensions, but is preferably characterized by a variable height, for example, ranging from 1 to 15 m and a diameter ranging from 1 to 5 m. The substantially cylindrical container and the upper and lower closing elements are generally made of carbon steel, corrosion-resistant steel or are made of steel bound with metals selected from those of Groups 5-10 such as, for example, vanadium, niobium, chromium, molybdenum, tungsten, manganese, nickel, etc. The thicknesses of the wall of the body depend on the temperature and pressure at which the reaction takes place, but can generally range from 20 to 100 mm. The reactor, object of the present invention, can be positioned either vertically or horizontally or at any angle with respect to the ground.

A plurality of tubular elements containing open-cell foams is preferably positioned inside the substantially cylindrical container. Said elements are in the form of a bundle of tubes, spaced from each other, inserted inside the cylindrical container and immersed in the thermoregulation liquid of the reaction temperature, for example water, in the case of exothermic reactions, or diathermic oil in the case of endothermic reactions.

In the preferred case, the bundle has a diameter which is substantially equal to the internal diameter of the cylindrical container (a), or slightly smaller, and occupies a volume ranging from 50 to 90% of the total volume of the body (a), preferably from 60 to 80%. The bundle comprises a number of tubular elements ranging from 10 to 20,000, preferably from 100 to 10,000, more preferably from 1,000 to 8,000.

The tubular elements are normally supported on perforated metallic plates, preferably of the same material as the cylindrical container and ends of the reactor, according to known procedures for similar tube-bundle structures. Said plates, called tube plates according to their use, are perforated transversal septa, positioned close to the upper and lower closing elements (caps) of the reactor, seal- and force-welded onto the walls of the cylindrical container, in which the ends of the tubular elements of the bundle are inserted and seal-fixed. The thickness of each tube plate, preferably ranging from 30 to 400 mm, depending on the diameter of the reactor, more preferably from 100 to 300 mm in reactors for the Fischer-Tropsch synthesis, is adequate for tolerating the pressure differences. In this way, when operating, the feeding streams of the reagents are channeled in the tubular elements containing the open-cell foam and catalyst, in which the reaction takes place, and the products are then collected and removed at the outlet, without any mixing or loss of fluids towards the thermoregulating fluid which is circulating in the cylindrical container at the mantle side.

Each tubular element contains in its interior at least one body consisting of open-cell foam. The foam, preferably rigid, can have a monolithic structure (single piece) or it can comprise a plurality of portions or pieces that can be inserted inside the cylindrical element. If the foam is composed of a plurality of pieces, for example from 2 to 10 pieces, these can be prepared starting from the same thermoconductor material, preferably metallic, or different materials, also with a different thermal conductivity, to be distributed inside the tube in relation to the temperature profile to be obtained for the relative reaction. The single pieces can also have various geometries or a different average diameter of the pores, or diameter of the trabeculae.

The foam, either monolithic or with separate portions, does not necessarily have to occupy the whole length or volume of the tubular element. The foam can also occupy a limited portion of the tube equal to at least 10%, preferably from 50 to 90% of its internal volume, the remaining part remaining empty or being filled with another type of catalytic filling or inert material.

The body consisting of an open-cell foam, or cellular structure, is suitably shaped so as to adapt itself to the geometry of the tubular element in which it is inserted. In the commonest type of tubular element with a cylindrical geometry, the foam body will also suitably have a cylindrical geometry with a diameter substantially coinciding with the internal diameter of the tubular element, preferably ranging from 0.5 to 20 cm, more preferably from 1 to 10 cm, even more preferably from 1 to 5 cm, which, in the operative phase, allows the reaction heat to be disposed of, in the case of an exothermic reaction, or implementing the heat necessary for the reaction, in the case of an endothermic reaction, with a high radial heat-exchange coefficient. The foam structure is therefore in the form of a plurality of interconnected cells, having an irregular polygonal section, with a length of the sides preferably ranging from 0.1 to 10 mm.

The transversal section of the cells can differ in form and dimension from point to point in the structure. Circular, semicircular and elliptic sections can also be obtained, or also with a more complex form. The structure of the open-cell foams suitable for the present invention is also characterized by the diameter or thickness of the trabeculae forming the supporting structure of the foam itself and the thermoconductor means through which most of the heat involved in the reaction underway, is transmitted. The filling degree of the foam, as previously defined, which according to the present invention, preferably ranges from 3 to 70%, more preferably from 10 to 40%, is directly connected to the thickness and density of the trabeculae.

In order to improve the heat exchange between the foam and tubular element, the same can be inserted into the tubular element so that the internal surface of the tubular element and the outer surface of the cylindrical foam are in contact, i.e. the clearance between the two surfaces is zero or reduced to the minimum. There are numerous methods for obtaining this result. The tubular element and the foam, for example, after being suitably assembled by inserting the foamy body into the tube, can be subjected to drawing through a die having an identical section, in form and dimension, to that of the metallic foam.

Alternatively, the metallic foam, having a section identical to that of the interior of the tube, is cooled in liquid nitrogen to cause its volumetric contraction. The contracted foam is then inserted into the tube and heated naturally up to room temperature. Alternatively, the tube can be expanded by heating, the foam inserted and then the whole unit is cooled to room temperature.

According to a further embodiment of the present invention, the body consisting of the open-cell foam can be inserted into the tubular element, leaving a small distance, usually from 0.1 to 1 mm, between the wall of the latter and the apparent wall of the foamy body. This creates the presence of a thin volume between the two walls, possibly also comprising packed catalytic bodies, where the presence of convective flows can surprisingly favour the heat exchange, also in the absence of a direct contact between the trabeculae of the foam and the internal wall of the tube.

The foam of the present invention does not exert the role of supporting the catalyst, but must favour the efficient removal of the reaction heat. For this reason, it is made of a material having an intrinsic thermal conductivity higher than 10 W/m/K, preferably ranging from 100 to 400 W/m/K. For reasons of dimensional stability at the reaction temperature, the material is preferably selected from metals such as steel, possibly of the same type as the cylindrical body, aluminium, copper, nickel, chromium, or alloys of the same. The metal is preferably aluminium or an alloy of aluminium, for example the alloy Al-6161-T6. Alternatively, thermally conductive ceramic materials can be used, such as graphite or silicon carbide.

The foam, moreover, is preferably made of inert materials with respect to the chemical reaction which develops in the reactor.

An example of the preparation of an open-cell foam according to the present invention is provided in U.S. Pat. Nos. 3,616,841 and 3,946,039 (Energy Research & Generation). According to these methods, the foam is prepared starting from expanded products, for example from rigid and crosslinked polyurethane foams with the desired structure of the end-product. The polyurethane foam is closely filled with gypsum-type material which hardens to form a solid structure.

The structure thus obtained is subjected to heating for the thermal demolition of the polyurethane resin. A mould is thus obtained, which reproduces the structure of the starting foam.

At this point, the internal cavities of the mould can be filled with the metal in the molten state. After cooling, the gypsum can be eliminated and a metallic foam is recovered, which reproduces the cellular structure of the starting polyurethane resin.

Another example of open-cell foams suitable for being used in reactors according to the present invention, are those commercialized by the company ERG Aerospace Corporation with the trade-name Duocel®.

The foams used in the present invention can have an isotropic or anisotropic structure.

The catalyst in the form of particulate, preferably in the form of packed bodies (for example balls, cylinders, rings, etc., preferably granules having a sphere-like form), are arranged inside each cell of the monolithic structure of the open-cell foam, so as to fill its volume. The fill factor, defined as the ratio between the volume of catalyst and the volume of empty space available, preferably ranges from 0.2 to 0.8, more preferably from 0.4 to 0.7.

With this arrangement of the catalyst, an optimum compromise can be obtained between the pressure drops of the flows at the turn of the reactor, the availability of adequate quantities of catalyst per volume unit of the reactor and an efficient removal of the reaction heat, thanks to the continuous conductive monolithic structure.

The particle-size of the catalyst is conveniently selected from the limits specified so as to have a narrow distribution, i.e. so that the dimensions of the granules are as homogeneous as possible. The dimensions are conveniently selected by experts in the field so as to allow an easy flow through the pores and cavities of the open-cell foam and a uniform filling of the same, at the same time enabling the flow of the reaction mixture without high pressure drops, preferably less than 20% of the pressure at the inlet.

The filling can be effected, for example, using a hopper with a flexible tube into which a pre-established quantity of catalyst, substantially identical for all the tubular elements, is charged. The flowing of the catalyst into the foam can be facilitated by pneumatic-type transport and/or with the help of suitable vibration systems.

In order to obtain an efficient confinement of the catalyst present in the open-pore foams of each tubular element, the reactor is preferably equipped with a suitable porous or fibrous septum situated at least at the end of the tubular elements facing downwards. Alternatively, each tubular element can be provided, at least at one end, preferably that at the outlet of the reaction fluid, with a porous or fibrous septum.

The tubular element thus formed and charged with the granular catalyst can be introduced into the reactor for effecting exothermic or endothermic reactions.

Alternatively, the same charging operations of the catalyst can be effected after installing the tubular elements comprising the bodies of open-cell foam inside the reactor, thus forming a tube bundle.

The reactor, object of the present invention, can be used, in particular, for exothermic catalytic reactions, such as Fischer-Tropsch reactions, where a gaseous reagent phase, consisting of a mixture of CO and $H_2$ (synthesis gas), flows, coming into contact with a substantially fixed bed of catalyst in the form of particulate, for example in granules, creating a liquid/vapour phase, at the reaction temperature and pressure, prevalently consisting of water and saturated and unsaturated hydrocarbons, substantially free of aromatic compounds.

The synthesis gas preferably comes from steam-reforming and/or partial oxidation of natural gas or other hydrocarbons, on the basis of the reactions described, for example, in U.S. Pat. No. 5,645,613. Alternatively, the synthesis gas can come from other production techniques such as, for example, "autothermal reforming", catalytic partial oxidation or from the gasification of coal, or other carbonaceous products, with high-temperature steam as described in "Catalysis Science and Technology", vol. 1, Springer-Verlag, New York, 1981.

The products obtainable from the Fischer-Tropsch process are substantially divided into two phases, under the usual functioning conditions of the reactor. A lighter vapour phase, essentially consisting of a mixture of hydrocarbons with a number of carbon atoms ranging from 1 to 18, and reaction by-products, such as steam, $CO_2$, alcohols, etc. This phase comprises the $C_5$-$C_{10}$ fraction, having a boiling point, at normal pressure, equal to or lower than about 150° C. The second phase produced essentially consists of paraffinic waxes, liquid at the reaction temperature, comprising, depending on the process and catalysts used, mixtures of linear, branched, saturated or unsaturated hydrocarbons with a high number of carbon atoms. These are generally hydrocarbon mixtures which have a boiling point, at normal pressure, higher than 200° C., for example ranging from 250 to 650° C. (upper limit extrapolated from data at reduced pressure). With cobalt catalysts, linear waxes, solid at room temperature, are normally produced.

The Fischer-Tropsch reaction is carried out at temperatures equal to or higher than 150° C., for example ranging from 200 to 350° C., maintaining a pressure ranging from 0.1 to 10 MPa inside the reactor. More significant details on Fischer-Tropsch reaction are available in "Catalysis Science and Technology" mentioned above.

The catalyst is generally based on cobalt or iron supported on an inert solid. The catalyst, which is preferably adapted to the reactor according to the present invention, is based on cobalt dispersed on a solid carrier consisting of at least one oxide selected from one or more of the following elements: Si, Ti, Al, Zr, Mg. Preferred carriers are silica, alumina or titania, possibly modified, according to the known techniques, in order to improve their chemical and mechanical resistance. Alternatively, other carriers can be used, such as, for example, silicon carbide.

The cobalt is present in the catalyst in quantities ranging from 1 to 50% by weight, generally from 5 to 35%, with respect to the total weight. The catalyst used can also comprise further additional elements. It can comprise, for example, with respect to the total weight, from 0.01% to 5% by weight, preferably from 0.1 to 3%, of ruthenium, platinum or silver and from 0.01% to 5% by weight, preferably from 0.1 to 3%, of at least a third element selected from those belonging to group (according to the Periodic Table of Elements approved by IUPAC). Catalysts of this type are known in literature and described, together with their preparation, in patent EP 756.895.

Further examples of catalysts are always based on cobalt but containing, as promoter element, tantalum in quantities of 0.01-5% by weight, with respect to the total weight, preferably from 0.1-3%. These catalysts are prepared by first depositing a cobalt salt onto the inert carrier (silica or alumina), for example by means of the wet impregnation technique, followed by a calcination step and, optionally, a reduction and passivation step of the calcined product. A derivative of tantalum (particularly tantalum alcoholates) is deposited on the catalytic precursor thus obtained, preferably with the wet impregnation technique, followed by calcination and, optionally, reduction and passivation.

The catalyst, whatever its chemical composition may be, is used in the form of particulate, for example spherical granules with an average dimension of less than 3 mm, preferably ranging from 0.05 to 1 mm, more preferably from 0.10 to 0.80 mm.

For a better understanding of the reactor for exothermic/endothermic chemical reactions, object of the present invention, reference will be made to the drawings of the enclosed Figure which represent an illustrative and non-limiting embodiment. In particular, the drawing of FIG. 1 schematically represents a longitudinal section of a reactor according to the present invention, in particular of the type that can be used for carrying out a Fischer-Tropsch reaction.

Figure 1:
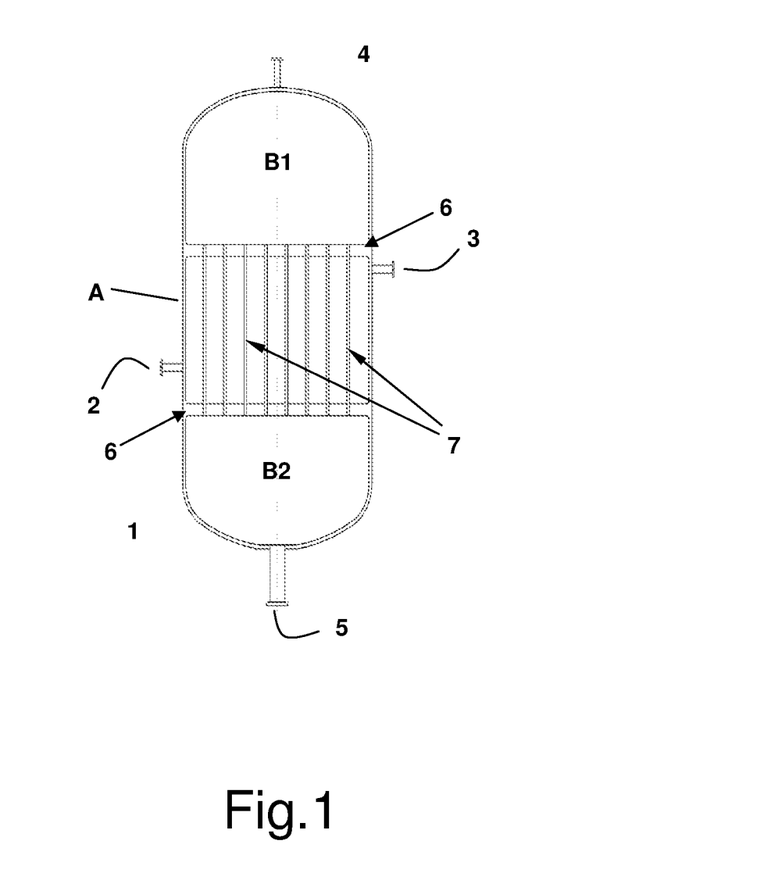

According to FIG. 1, the reactor (1) essentially consists of a cylindrical container A and two closing elements B1 and B2 separated from said container A by means of two tube plates (6). The cylindrical container A has an inlet (2) and an outlet (3) of the thermoregulation fluid of the chemical reaction involved, whereas the closing elements B1 and B2 have an inlet (4) and/or an outlet (5) of the reagents and reaction products. Alternatively, the inlet and outlet can be inverted.

Figure 2:
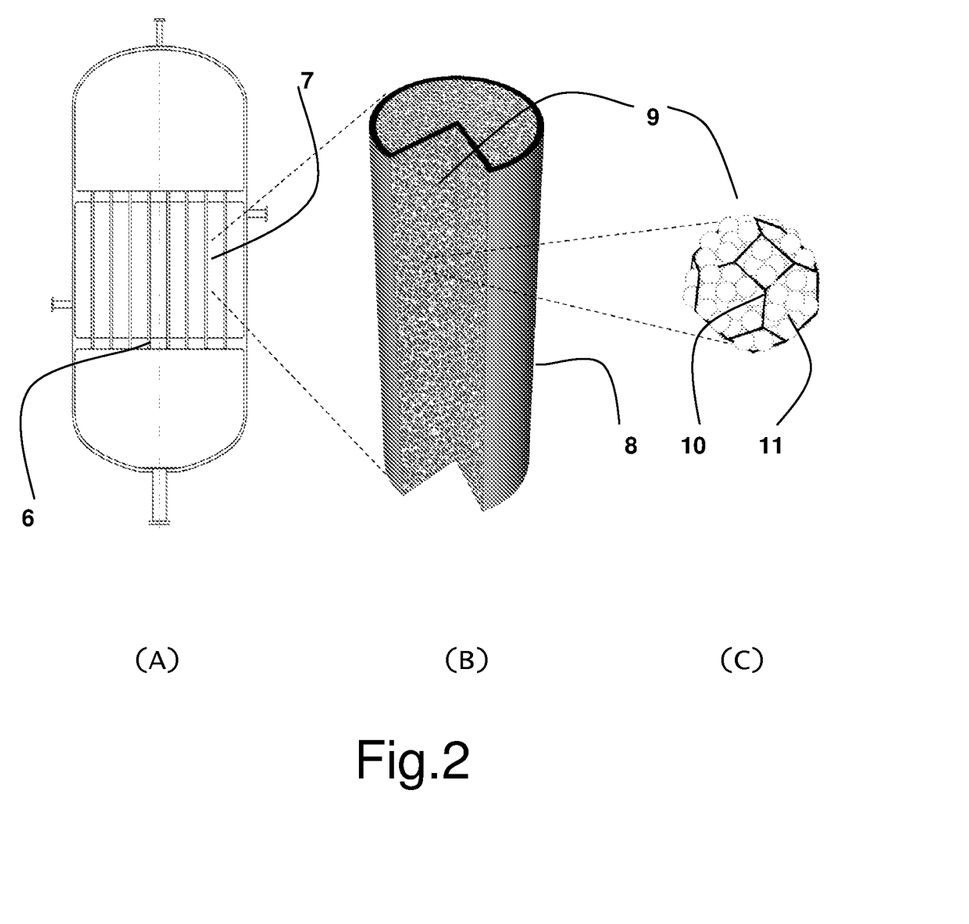
FIG. 2, in its representations (A), (B) and (C), schematically represents, according to consecutive enlargements, (A) said reactor of FIG. 1, (B) an axonometric section of one of the cellular structures or open-cell foams arranged inside each tubular element and (C) a detail of the arrangement of the granular catalyst inside an open cell of said foam.
Figure 3:
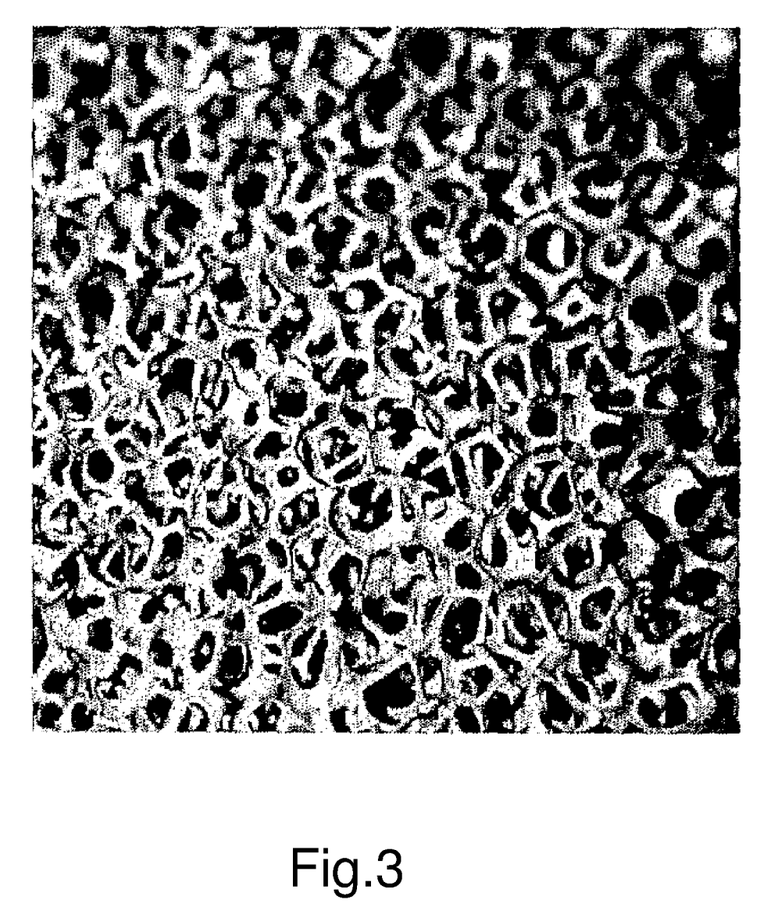
FIG. 3 is a photo of a foam that can be used for producing the reactor according to the present invention.

The bundle of tubular elements (7) is arranged inside the cylindrical container A, whose ends are respectively seal inserted in the two tube plates (6), so that the two closing elements B1 and B2 are put in fluid communication with each other through the interior of the tubular elements. Each tubular element (7) contains one or more monolithic structures of open-cell foam, preferably having a cylindrical form with substantially the same diameter as the tubular element, whose detail is visible in the drawing of FIG. 2. With reference to FIG. 2B, said open-cell monolithic structure consists of a cylindrical body (8) whose interior comprises a plurality of interconnected cells (9) delimited by trabeculae (10). The catalyst, for example in the form of a bed packed with granules (11), is arranged inside the cells (9), as shown in the drawing of FIG. 2C.

The functioning of the reactor, for example for a Fischer-Tropsch exothermic reaction, is evident from the previous description and from the drawings. Once the catalyst (11) has been charged inside the cells of the foams contained in the tubular elements (7), the synthesis gas is fed, for example through the inlet duct (4). As they flow inside the cells filled with monolithic foams, the reagent gases come into contact with the catalytic granules, they propagate inside the pores and react forming a vapour phase and a liquid phase, the former essentially consisting of $C_1$ to $C_{16}$ hydrocarbons, in addition to water and traces of $CO_2$, the latter essentially composed of high-molecular-weight paraffinic waxes. The reaction product is discharged through the outlet duct (5), together with the reaction by-products and non-converted reagents. During the reaction, there is the production of heat which is removed by a cooling fluid fed and discharged through (2) and (3).

Thanks to the monolithic structure and thermally conductive material with which the open-cell monolithic foams are produced, the reaction heat is transferred prevalently by conduction to the cooling fluid with a much higher efficiency with respect to the case of a traditional packed fixed-bed reactor.

In order to demonstrate the higher thermal exchange efficiency and improved productivity associated with the present invention, an applicative example is proposed hereunder for purely illustrative and non-limiting purposes of the present invention.

EXAMPLE

A monotubular reactor is first prepared, having a length of 1.1 m, cooled externally, in which an open-cell and full trabeculae monolithic foam is inserted, metre long, made of aluminium, having an outer diameter substantially coinciding with the internal diameter of the reactor, equal to 28 mm, a filling degree of 15% and an average pore size of about 0.63 mm (density of 16 pores per centimetre). The surface per unit volume of said foam is 900 $m^2/m^3$.

The trabeculae of said foam are coated (by means of slurry coating techniques) with a layer of catalyst for the Fischer-Tropsch synthesis, based on cobalt supported on alumina, having a thickness equal to 50 μm. The quantity of catalyst charged into the reactor is 43.4 g.

The reactor operates with a pressure at the head equal to 20 bar, feeding 4,000 $Ncm^3/h/g_{cat}$ of a mixture of CO and $H_2$ preheated to 234° C. and having a ratio between the two species equal to 2.1 moles of $H_2$ per mole of CO. The coolant is kept at a constant temperature of 234° C.

The total specific productivity of this reactor is equal to 44.5 $kg/h/m^3$ and the pressure drops are negligible. The temperature profile inside the catalytic bed is practically flat and differs from the temperature of the coolant by less than 2° C. ($T_{max}$=236° C.)

An analogous monotubular reactor is then prepared, cooled externally, consisting of an open-cell monolithic foam, 1 meter long, made of aluminium, having an outer diameter equal to 28 mm, a filling degree of 15% and an average pore size of about 0.63 mm (density of 16 pores per centimetre).

In this case, however, the trabeculae of the foam are not coated, but the foam cells are filled with catalytic particles packed with the same cobalt-based catalyst supported on alumina used in the previous test, having an average outer diameter of 300 μm with a very narrow distribution obtained by means of selective sieving. In particular, the finely divided catalyst is simply poured into the tubular element containing the foam. In order to guarantee a homogeneous distribution of the catalytic particles in the foam cells, a vibratory motion of the tubular element is associated with the filling phase. The quantity of catalyst charged into the reactor is 454.8 g.

The reactor operates with a pressure at the head equal to 20 bar, feeding 4,000 $Ncm^3/h/g_{cat}$ of a mixture of CO and $H_2$ preheated to 219° C. and having a ratio between the two species equal to 2.1 moles of $H_2$ per mole of CO. The coolant is kept at a constant temperature of 219° C.

The total specific productivity of this reactor is equal to 356 $kg/h/m^3$ and the pressure drops, slightly higher than those of the previous case, are still tolerable, as they are lower than 1 bar. The temperature profile of the catalytic bed also has a temperature difference still maintained below 14° C. and differs from the temperature of the coolant by not more than 7° C. ($T_{max}$=236° C.).

By adopting a reactor loaded with foams packed with the catalytic particulate according to the present invention, instead of a reactor charged with washcoated foams, a productivity up to 8 times higher can therefore be obtained, with the same reactor volume, also guaranteeing the possibility of operating under modest pressure drop conditions and relatively insignificant temperature profiles.

The invention claimed is:

1. A reactor, comprising:
    a substantially cylindrical container wherein a feeder and a discharger of a thermoregulation fluid for a chemical reaction are present;
    a top closing element and a bottom closing element placed at a top end and a bottom end of the container, respectively;
    a feeder of a reagent phase positioned in the top closing element or in the bottom closing element;
    a discharger of a product phase positioned in the top closing element or in the bottom closing element;
    a tubular element, arranged vertically inside the container between the top closing element and the bottom closing element, comprising in its interior a body having a structure of an open-cell foam, wherein:
        the open-cell foam has an average pore dimension ranging from 0.4 to 2.0 mm and a filling degree from 10% to 40%, and is made of a material having an intrinsic thermal conductivity higher than 10 W/m/K, and
        the body is configured to be filled with a catalyst in a form of particles, wherein a fill factor between a volume of the particles and a volume of a void space in the foam ranges from 0.4 to 0.7.

2. The reactor according to claim 1, wherein said reactor is arranged either vertically or horizontally or at any angle with respect to a ground.

3. The reactor according to claim 1, comprising at least five of said tubular element, which houses foams.

4. The reactor according to claim 3, wherein the at least five tubular elements form a tube bundle having a diameter substantially equal to or slightly smaller than an internal diameter of the cylindrical container, which occupies a volume ranging from 50 to 90% of a total volume of the cylindrical container.

5. The reactor according to claim 1, wherein said tubular element comprises open-cell foams having a relative density ranging from 3 to 70%.

6. The reactor according to claim 3, wherein the foams have an average pore dimension of from 0.5 to 1.0 mm.

7. The reactor according to claim 3, wherein the foams are rigid foams.

8. The reactor according to claim 5, wherein the catalyst in a form of a particulate is placed in said open-cell foams.

9. The reactor according to claim 8, wherein a fill ratio of (particulate volume)/(volume of void space available in the foams) ranges from 0.2 to 0.8.

10. The reactor according to claim 8, wherein a ratio between an average pore dimension of the foam and an average dimension of the catalytic particles ranges from 1.1 to 30.

11. A process for effecting an exothermic or endothermic catalytic reaction, the process comprising
    feeding reagents to the reactor according to claim 1, filled with the catalyst in a foam of a finely subdivided particulate.

12. The process according to claim 11, wherein the catalytic reaction is a Fischer-Tropsch reaction.

13. The process according to claim 11, wherein the catalyst is in a form of packed bodies.

* * * * *